(12) United States Patent
Mauz (10) Patent No.: US 7,758,057 B2
(45) Date of Patent: Jul. 20, 2010

(54) INDEPENDENT SUSPENSION WITH CHASSIS-STIFFENING PNEUMATIC OR HYDRAULIC SUSPENSION PARTS

(75) Inventor: Uwe Mauz, Esslingen (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 12/281,292

(22) PCT Filed: Feb. 24, 2007

(86) PCT No.: PCT/EP2007/001612

§ 371 (c)(1),
(2), (4) Date: Dec. 23, 2008

(87) PCT Pub. No.: WO2007/101569

PCT Pub. Date: Sep. 13, 2007

(65) Prior Publication Data

US 2009/0194966 A1    Aug. 6, 2009

(30) Foreign Application Priority Data

Mar. 1, 2006   (DE)   ........................ 10 2006 009 301

(51) Int. Cl.
*B60G 15/08* (2006.01)
(52) U.S. Cl. .............................................. 280/124.145
(58) Field of Classification Search .......... 280/93.512, 280/124.135, 124.136, 124.147, 124.157, 280/124.158, 124.145
See application file for complete search history.

(56) References Cited

U.S. PATENT DOCUMENTS

| | | | | |
|---|---|---|---|---|
| 3,033,553 A | * | 5/1962 | Allinquant | 267/256 |
| 4,332,397 A | * | 6/1982 | Steger | 280/124.155 |
| 4,778,198 A | * | 10/1988 | Gold | 280/124.147 |
| 5,169,171 A | | 12/1992 | Ban et al. | |
| 5,868,410 A | * | 2/1999 | Kawabe et al. | 280/124.15 |
| 6,027,130 A | * | 2/2000 | Kawabe et al. | 280/124.135 |
| 6,116,626 A | * | 9/2000 | Cherry et al. | 280/124.135 |
| 6,116,627 A | * | 9/2000 | Kawabe et al. | 280/124.15 |

(Continued)

FOREIGN PATENT DOCUMENTS

DE    41 17 017 A1    11/1991

(Continued)

OTHER PUBLICATIONS

International Search Report dated Jul. 5, 2007 including English translation of the relevant portions (Ten (10) pages).

(Continued)

*Primary Examiner*—Paul N Dickson
*Assistant Examiner*—Robert A Coker
(74) *Attorney, Agent, or Firm*—Crowell & Moring LLP (57) ABSTRACT

A vehicle independent suspension has a plurality of wheel-control links, with an upper link being a transverse or diagonal link and with the surface spanned by the joint points of the upper transverse or diagonal link intersecting, at least in regions, a gas or hydropneumatic spring arrangement which suspends the wheel. The gas or hydropneumatic spring arrangement has a bellows which is arranged between a dimensionally rigid head plate arranged on the vehicle body and a rolling piston. Vehicle-body-side joints of the upper transverse or diagonal link are supported on the head plate.

9 Claims, 5 Drawing Sheets

U.S. PATENT DOCUMENTS

| | | |
|---|---|---|
| 6,398,202 B1 | 6/2002 | Schaible |
| 2002/0113394 A1* | 8/2002 | Ziech et al. ............ 280/124.109 |
| 2004/0072479 A1 | 4/2004 | Roycroft |

FOREIGN PATENT DOCUMENTS

| | | |
|---|---|---|
| DE | 10 2004 003 395 A1 | 8/2005 |
| EP | 1557339 A1 * | 7/2005 |
| GB | 2 387 155 A | 10/2003 |
| JP | 5-254327 A | 10/1993 |
| JP | 10-250332 A | 9/1998 |

OTHER PUBLICATIONS

PCT/ISA/237 including English translation of the relevant portion (Seven (7) pages).

* cited by examiner

INDEPENDENT SUSPENSION WITH CHASSIS-STIFFENING PNEUMATIC OR HYDRAULIC SUSPENSION PARTS

This application is a national stage of International Application No. PCT/EP2007/001612, filed Feb. 24, 2007, which claims priority under 35 U.S.C. §119 to German Patent Application No. 10 2006 009 301.1, filed Mar. 1, 2006, the entire disclosure of which is herein expressly incorporated by reference.

BACKGROUND AND SUMMARY OF THE INVENTION

The invention relates to an independent suspension having a plurality of wheel-control links, with an upper link being a transverse or diagonal link and with the surface spanned by the joint points of the upper transverse or diagonal link intersecting, at least in regions, a gas or hydraulic spring arrangement which suspends the wheel.

German patent document DE 10 2004 003 395 A1 discloses an independent suspension which comprises two wheel-control transverse links and a wheel-supporting air spring strut. A hose-type rolling bellows of the air spring strut is substantially surrounded by the upper transverse link. The upper transverse link and an upper support mount of the air spring strut are mounted separately on the vehicle body.

One object of the present invention is to provide an independent suspension having upper transverse or diagonal links, in which a mounting arrangement of the upper transverse or diagonal link is supported on the vehicle body, on a subframe or on an assembly frame, is of dimensionally rigid design, and is easy to assemble and service.

Another object of the invention is to provide such an independent suspension, without any change to the installation space of the axle.

These and other objects and advantages are achieved by the independent suspension according to the invention, in which the gas or hydropneumatic spring arrangement has a bellows arranged between a dimensionally rigid head plate and a rolling piston. The head plate is rigidly arranged on the vehicle body, on an assembly frame or on a subframe. The vehicle-body-side joints of the upper transverse or diagonal link are supported on the head plate.

According to the invention a gas or hydropneumatic spring arrangement for an independent suspension is varied such that parts of it can assume wheel-control and wheel-supporting functions. If, for example, a gas spring damper strut is used as a gas spring arrangement, the size and shape of the head plate of the gas spring damper strut are designed as part of the supporting structure of the upper link mount. In addition, the head plate holds the upper damper mount, so that an additional chassis support point on the vehicle body is unnecessary.

Among other advantages, the integration of the gas or hydropneumatic spring arrangement into the support structure of the chassis suspension achieves both a weight saving and a reduction in installation space.

Other objects, advantages and novel features of the present invention will become apparent from the following detailed description of the invention when considered in conjunction with the accompanying drawings.

DETAILED DESCRIPTION OF THE DRAWINGS

Figure 1:
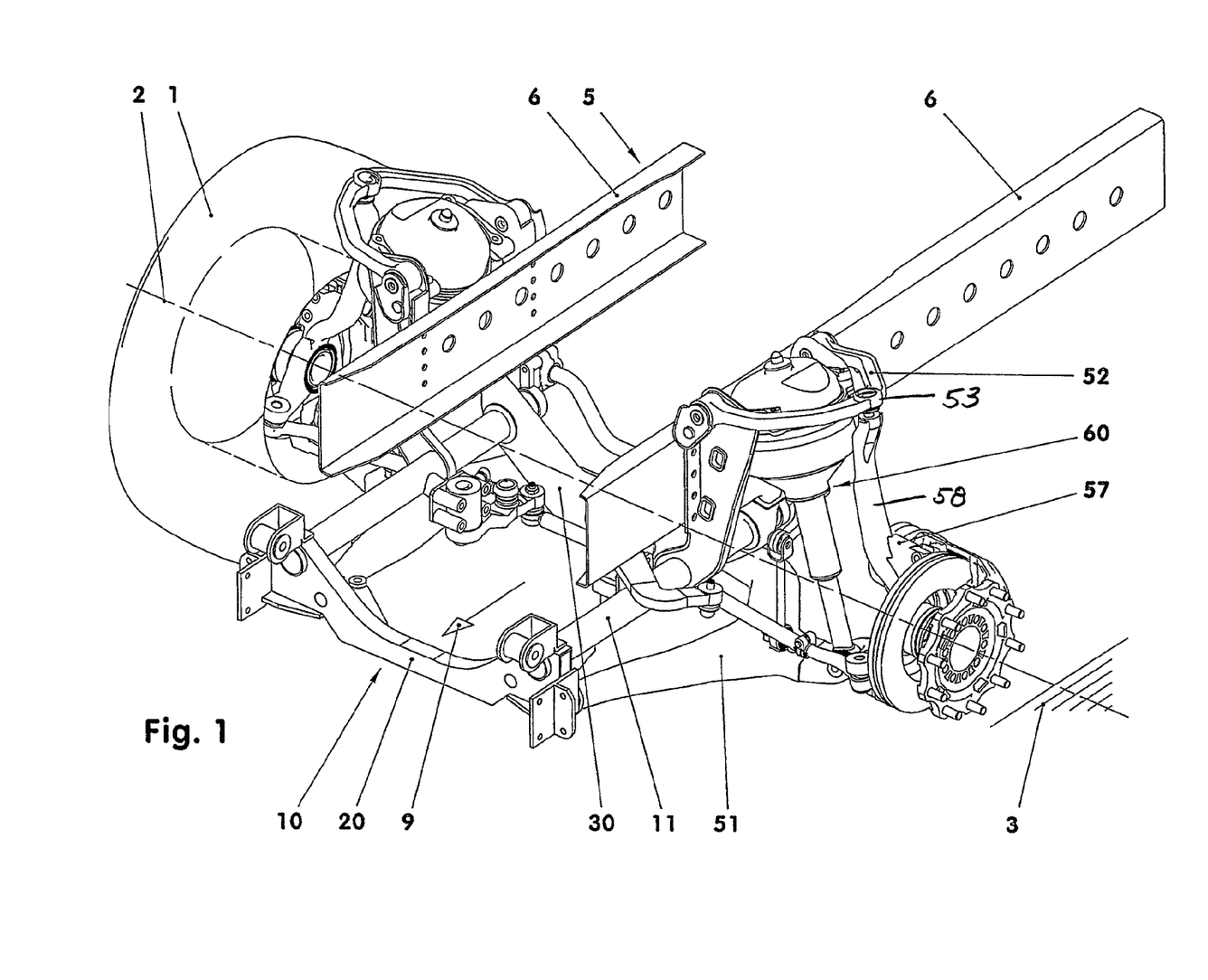
FIG. 1 shows a utility vehicle front axle, with a ladder frame.
Figure 2:
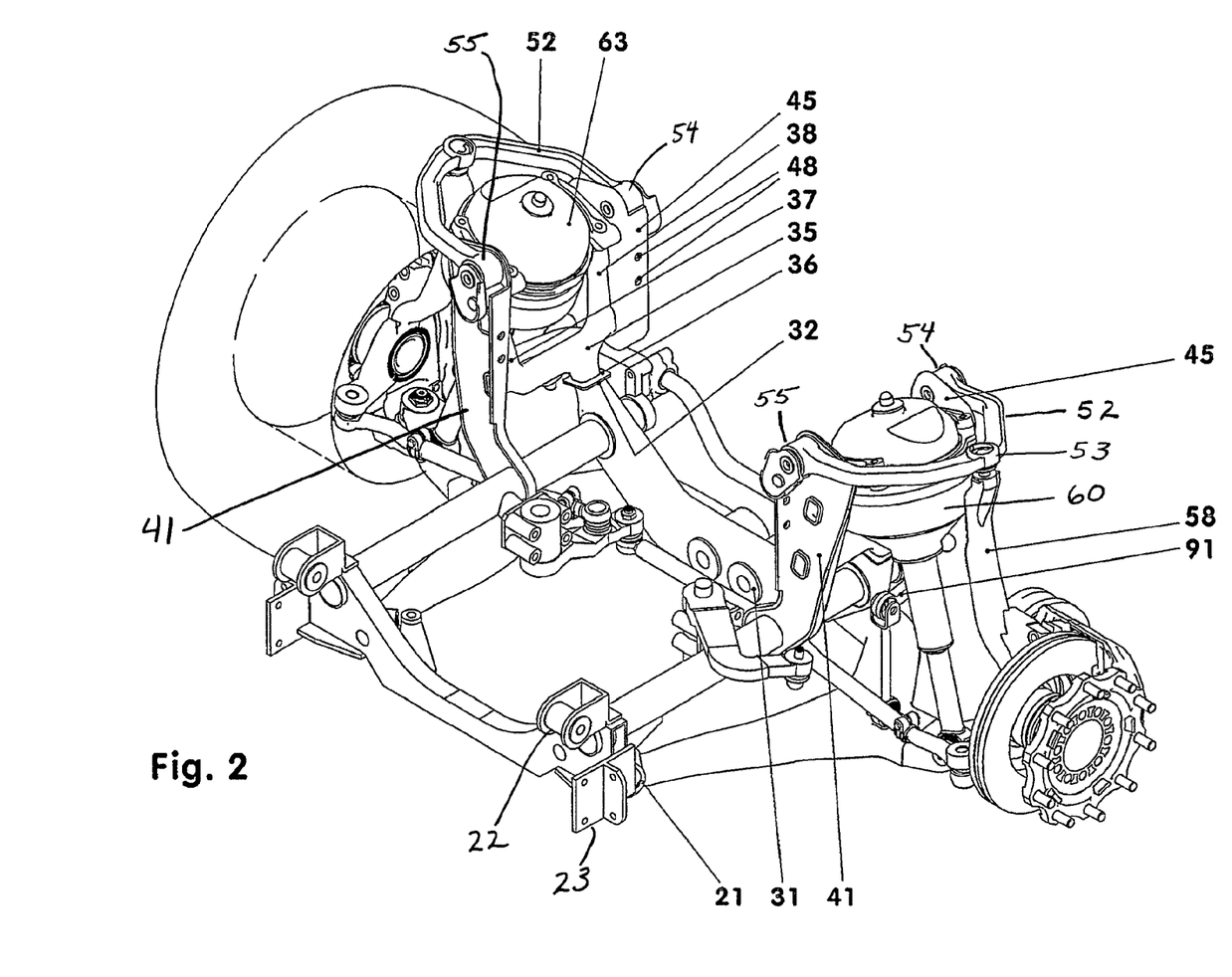
FIG. 2 is a view similar to that of FIG. 1, but without the ladder frame.
Figure 3:
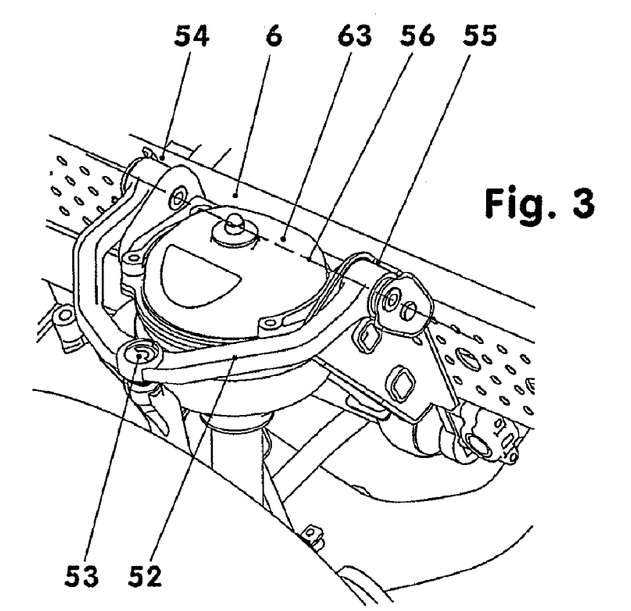
FIG. 3 shows a gas spring damper strut with an upper transverse link.

FIG. 1 shows a double-wishbone high link axle, which is fastened to a ladder frame, as a front axle of a utility vehicle with independent suspension. The front axle is for example steered, but not driven. In FIG. 2, the front axle is illustrated without the longitudinal beams (6) of the vehicle frame (5).

In FIGS. 1 and 2, the individual independent suspension comprises inter alia a lower diagonal link (51), an upper transverse link (52), a wheel carrier (57) and a gas spring damper strut (60). The diagonal link (51) and the transverse link (52) of the front axle are articulatedly mounted on a subframe-like assembly frame (10). The assembly frame (10) itself is screwed directly (that is, not by way of elastomer joints) to the vehicle frame (5) and to the longitudinal beams (6).

In the independent suspension, the upper transverse link (52) has a wheel-carrier-side joint (53) whose shortest spacing from the roadway surface—in the construction position—corresponds at least to the tire diameter of the wheel (1) which is mounted here.

The assembly frame (10) is composed of two for example parallel longitudinal members (11), two transverse members (20, 30), two fork-like support elements (35), two front (41) and two rear transverse link carriers (45).

The tubular longitudinal members (11), which have for example a circular ring-shaped cross section, are aligned parallel to the longitudinal beams (6) and lie approximately at the level of the wheel rotational axis (2). The wheel rotational axis (2) is for example tangent to the longitudinal members (11) at their underside in the construction position. Each longitudinal member (11) lies below the closest longitudinal beam (6). The front ends of the longitudinal members (11) are connected in a dimensionally rigid fashion by means of the front transverse member (20), and the rear ends are connected in a dimensionally rigid fashion by means of the rear transverse member (30). The longitudinal members (11) are welded to the cross members (20, 30) so as to form an at least approximately rectangular frame as viewed in plan view. Here, the front cross member (20) is situated in front of the wheel rotational axle (2), while the rear cross member (30) is situated behind said wheel rotational axis (2).

The rear cross member (30) ends at both sides—a short distance below the longitudinal beams (6)—in each case in a flange (32). The upwardly projecting fork-like support elements (35) are welded onto the flanges (32). The individual support element (35) has a front (37) and a rear arm (38). The two arms (37, 38), which are at least approximately parallel, have a spacing relative to one another such that a gas spring damper strut (60) fits in between with its bellows region with a play of several millimeters or centimeters. (See, for example, FIG. 2.)

The foot-side flange (36) of the respective support element (35) has a shorter spacing to the rear arm (38) than to the front arm (37). The difference is approximately one-third of the total arm spacing.

Each rear arm (38) engages in a form-fitting manner into the respective rear transverse member carrier (45). The front arms (37) are connected in the same way to the front transverse link carriers (41). In addition to the form-fitting action, the arms (37, 38) and the transverse link carriers (41, 45) are welded to one another. The front transverse link carriers (41) are extended downward and additionally engage around in each case the closest tubular longitudinal member (11). The lower end, which engages around the longitudinal member (11), of the front transverse link carrier (41) is welded to the longitudinal member (11).

Figure 4:
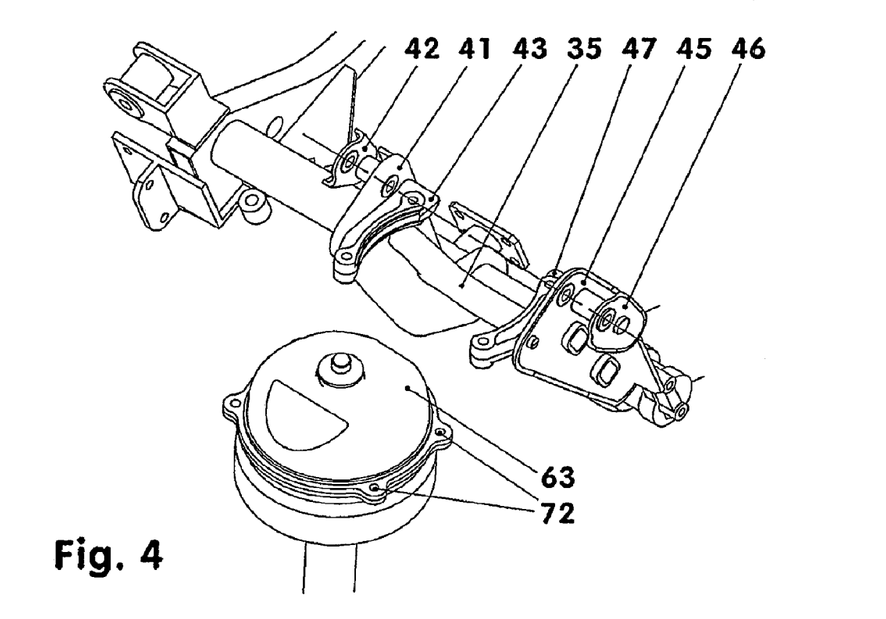
FIG. 4 is a view similar to that of FIG. 3, but with the gas spring damper strut dismounted, and without the upper transverse link.

In order to hold the vehicle-body-side transverse link joints (54, 55), the four transverse link carriers (41,45) are of fork-shaped design at their upper ends. (See also FIG. 4.) For this purpose, additional fork lugs (42, 46) are welded to the transverse link carriers (41, 45). The vehicle-body-side transverse link joints (54, 55) of the transverse links (52) have for example a horizontal pivot axis (56) which is also aligned at least approximately parallel to the direction of travel (9). Below the joint region, the transverse link carriers (41,45), which are arranged in pairs at each wheel side, support, on the surfaces which face toward one another, fastening brackets (43, 47) for mounting the gas spring damper strut (60). The dimensionally rigid fastening brackets (43, 47) have for example in each case two bores and a sickle-shaped contour which is aligned in the direction of the gas spring damper strut (60). The sickle-shaped contour is intended to permit the most form-fitting contact possible against the gas spring damper strut (60).

According to FIG. 2, the transverse link carriers (41, 45), which are of angular design in regions, have a plurality of bores (48), through which the assembly frame (10) is screwed to the longitudinal beams (6) of the ladder frame (5). (See FIG. 1.)

The front cross member (20) carries three fastening points at each end. The spatially lowest fastening points are the front mounts (21) of the diagonal links (51). Fastening points (joints 22) arranged in the upper region of the cross member (20) provide an articulated connection of leaf springs of a rigid axle which may alternatively be installed. Fastening points in the form of angular adapters (23) are situated at the ends of the front cross member (20) for fastening an impact shock absorber, the so-called crash box.

The rear mounts (31) of the lower diagonal links (51) are arranged on the rear cross member (30) in the central region. At the chassis side, the wheel carrier (57) is articulated on the diagonal links (51) which are situated below a horizontal wheel central plane (3), and articulated on the wheel-carrier-side joint (53) of the upper transverse link (52) by a vertically aligned wheel carrier arm (58).

Installed between the lower diagonal link (51) and the upper transverse link (52) is the gas spring damper strut (60). Its central line (61) (FIG. 6) is (measured in a vertical projection onto an imaginary vertical vehicle transverse plane) inclined by 15 to 20 degrees (FIG. 7), so that the two upper vehicle-body-side articulation points of the gas spring damper struts (60) of an axle are situated closer to one another than the corresponding lower, chassis-side articulation points. A projection of the central line (61) onto a vertical vehicle longitudinal plane is inclined by for example 2-4 degrees with respect to the vertical, with the lower articulation points preceding the upper articulation points in the direction of travel (9).

The air spring arrangement (62) (FIG. 6) or the gas spring component of the gas spring damper strut (60) is arranged in a space which is delimited with play by the respective longitudinal beam (6), the corresponding fork-like carrier element (35), the transverse link carriers (41, 45), the transverse link (42) and the wheel carrier arm (57).

Figures 5, 6:
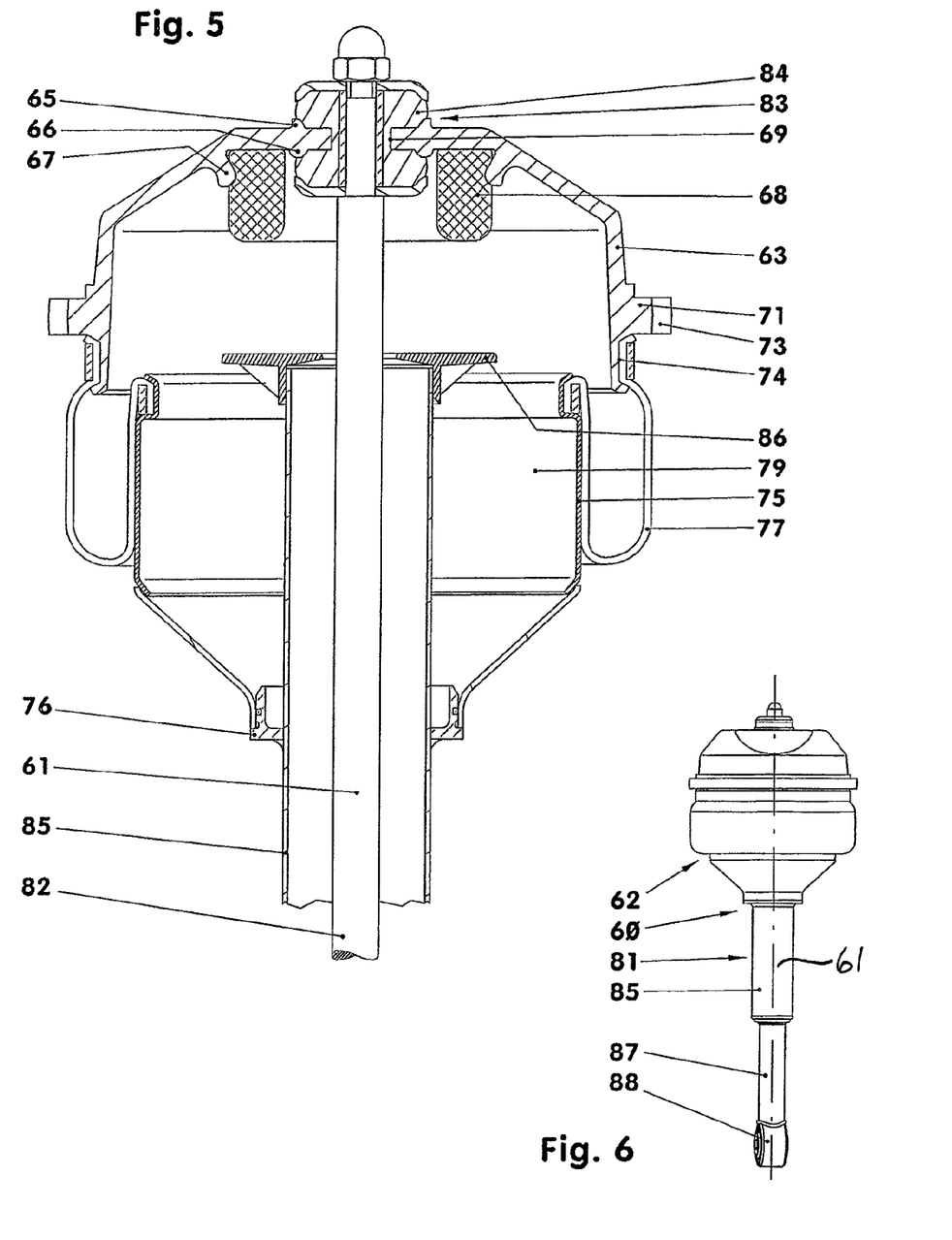
FIG. 5 shows a longitudinal section through a gas spring damper strut.
FIG. 6 shows a side view of a gas spring damper strut, reduced in size.

The gas spring damper strut (60) comprises a shock absorber (81). Of the latter, FIGS. 5 and 6 illustrate firstly the damper tube (85), with an extension (87) and joint eye (88), and secondly the piston rod (82) with its upper articulated supporting mount (83). According to FIGS. 1 and 2, the joint eye (88) is mounted on the diagonal link (51) in the vicinity of the lower wheel carrier joint. The supporting mount (83) is mounted in the dimensionally rigid head plate, which is designed as a support pot (63), of the gas spring (62).

The single-piece support pot (63), which has a pot shape composed in appearance of a frustoconical casing and a cylindrical casing, is formed for example as a cast-iron part (GJS 400), as an aluminum cast part, as a forged part or as a deep-drawn sheet-metal part. In the cylindrical casing region, the support pot has an encircling stiffening rib (71) in which are arranged for example four threaded bores (72), cf. FIG. 4. For this purpose, the rib (71) is widened in the region of the bores (72). In the case of a gas spring damper strut (60) being installed in the assembly frame (10), the rib (71) bears from below in a form-fitting and force-fitting manner against the fastening brackets (43, 47) of the transverse link carriers (41, 45).

To hold the supporting mount (83), the support pot (63) has a central bore (69) and for example two annular webs (65, 66), one (66) at the inside and one (65) at the outside. The elastomer body (84) of the supporting mount (83) is securely positioned on the annular webs (65, 66). The elastomer body (84) is seated (screwed) on the piston rod end, so as to be clamped between two disks which are held with a spacing to one another by means of a sleeve.

Arranged around the supporting mount (83), in the displacer space (79), is an annular rubber buffer (68) as a mechanical spring stroke limiter. Said rubber buffer (68) is held by a further annular web (67) which stiffens the support pot (63) at the inside. When the wheel (1) is completely compressed, the stop plate (86) which is arranged at the upper end of the damper tube (85) comes into contact with the rubber buffer (68).

As shown in FIG. 5, a spring plate (76), which is welded to the damper tube (85), supports a rolling piston (75) with for example a cylindrical bellows rolling region. A hose rolling bellows (77) arranged between the rolling piston (75) and the support pot (63) is held on the rolling piston (75) and on the support pot (63) in each case by means of a clamping ring. For this purpose, corresponding encircling beads are provided in the rolling piston (75) and in the support pot (63). The bead (74) of the support pot (63) is situated directly below the stiffening rib (71).

Within the gas spring damper strut (60), the piston rod (82) of the shock absorber (81) serves as a linear guide for the gas spring arrangement (62).

In the embodiment according to FIGS. 1-6, the support pot (63) performs four independent functions. First it stiffens the mount of the upper transverse link (52). Together with the transverse link carriers (41, 45), the longitudinal member (11) and the support element (35), it also forms a particularly dimensionally rigid assembly, whose torsional stiffness is additionally increased by means of the screw connection to the ladder frame (5). Furthermore, the support pot (63) holds the supporting mount (83) of the shock absorber (81), such that it is unnecessary for the supporting mount (83) to be separately articulated to the vehicle body (5).

Furthermore, when installing the gas spring damper strut (60) into the assembly subframe (10), it is possible to set the joint play of the joints (54, 55) by means of the screw connection of the support pot (63) to the transverse link carriers (41, 45) or by means of the fastening brackets (43, 47) thereof. The reason for the previous adjustment requirement was that of the pressing of the elastomer joints (54, 55) into the joint eyes of the upper transverse link (52). The pressed-in position of the elastomer joints (54, 55) is for example provided with a tolerance of 0.75 millimeters. In the worst case, the mount spacing may vary by 1.5 millimeters.

In order to prevent jamming of the link pivoting movement, the frame-side mounts have previously been adjustable. Here, however, the transverse link (52) is inserted with its elastomer joints (54, 55) on the transverse link carriers (41, 45), and the spacing between the transverse link carriers (41, 45)—of one wheel side—is varied such that the transverse link (52) can be moved with minimum play and without jamming. In that position, the support pot (63) is screwed to the transverse link carriers. During subsequent mounting of the assembly frame (10) on the ladder frame (5), the link play setting is secured once again by screwing the transverse link carriers (41, 45) to the longitudinal beams (6), such that, during servicing, the gas spring damper strut (60) may be exchanged without adjusting the link play in the process.

Not least, the bulging of the support pot (63) serves to considerably enlarge the displacer space (79), which is utilized to adapt the gas spring rate.

Figure 7:
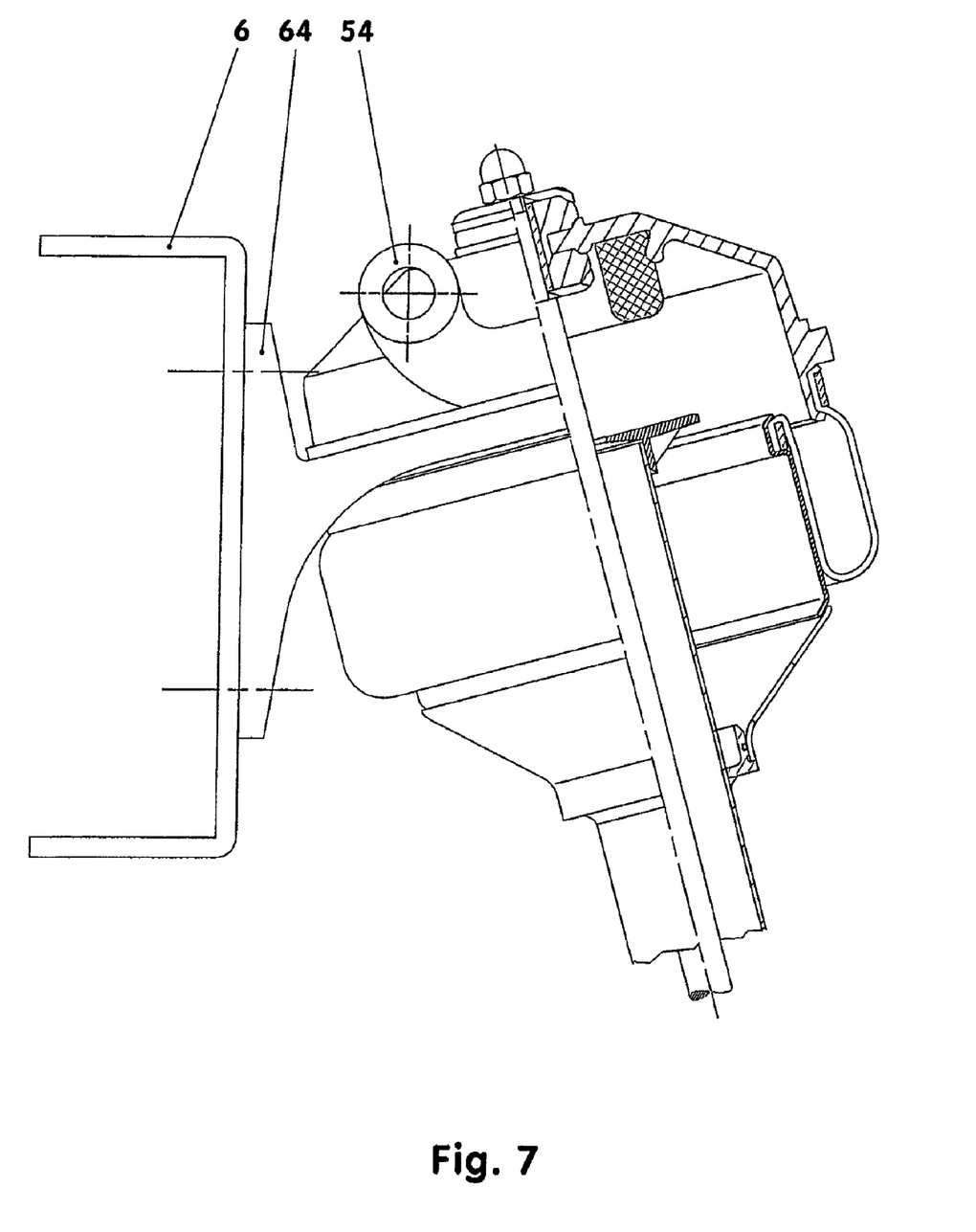
FIG. 7 shows a gas spring damper strut with a support pot which supports a fastening flange and link joint parts.

FIG. 7 shows a gas spring damper strut (60) which is screwed directly to the longitudinal beam (6) of the ladder frame (5). For this purpose, a support flange (64) is integrally formed on or fastened to the support pot (63). The support flange bears directly against the longitudinal beam (6). The receptacles for the vehicle-body-side joints (54, 55) of the upper transverse link (52) are additionally arranged on the support pot (63). This solution is possible if the independent suspension is arranged without an assembly frame on the vehicle body.

The following example of the disassembly of the driver-side gas spring damper strut (60) demonstrates the ease of assembly and servicing of the independent suspension with regard to the gas spring damper strut (60). Firstly, the driver-side longitudinal beam (6) is jacked up to such an extent that the driver-side wheel (1) can be dismounted, and the gas spring damper strut (60) is then separated from the compressed air supply, and is ventilated. After the wheel (1) is dismounted, the diagonal-link-side joint of the gas spring damper strut (60) to the diagonal link (51) is released. When the driver's cab is pivoted fully forward, the four screws which are seated in the fastening brackets (43, 47) of the transverse link carrier (41, 45) are then released, and removed, from above. The unpressurized gas spring damper strut (60) is now compressed upward. The joint eye (88) is finally raised forward over the outer track rod (98) and is then removed forward and downward. The new gas spring damper strut is mounted in the reverse sequence.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SYMBOLS

1 Wheel
2 Wheel rotational axes, central line
3 Horizontal plane through (2)
5 Vehicle frame, vehicle body
6 Longitudinal beams of the ladder frame (5)
9 Direction of travel
10 Assembly frame
11 Longitudinal member, tubular, right, left
20 Cross member, front
21 Diagonal link mount, front
30 Cross member, rear
31 Diagonal link mount, rear
32 Traverse flange
35 Support element, fork-like
36 Flange, foot side
37 Arm, front
38 Arm, rear
41 Transverse link carrier, front
42 Fork lugs
43 Fastening brackets
45 Transverse link carrier, rear
46 Fork lugs
47 Fastening brackets
48 Bores in (47)
51 Diagonal link, lower
52 Transverse link, upper
53 Joint, chassis-side, wheel-carrier-side
54, 55 Joints, vehicle-body-side
56 Pivot axis
57 Wheel carrier
58 Wheel carrier arm
60 Gas spring damper strut
61 Central line
62 Gas spring, air spring arrangement
63 Support pot, spring strut pot, head plate
64 Support flange
65 Annular web, outer
66 Annular web, inner
67 Annular web, inner, for (68)
68 Rubber buffer
69 Bore, central
71 Stiffening rib
72 Threaded bores
73 Widened portions
74 Bead, encircling
75 Rolling piston
76 Spring plate
77 Bellows, hose rolling bellows
79 Displacer space
81 Shock absorber
82 Piston rod
83 Supporting mount, piston rod joint, elastic
84 Elastomer body
85 Damper tube, damper cylinder
86 Stop plate
87 Extension
88 Joint eye

The invention claimed is:

1. A vehicle independent suspension having a plurality of wheel-control links, including an upper link, wherein: said upper link is one of a transverse link and a diagonal link, and has a plurality of joints situated at points located thereon; a surface spanned by said points on said upper link intersects, at least in regions, a gas or hydropneumatic spring arrangement which suspends the wheel; the gas or hydropneumatic spring arrangement has a bellows arranged between a dimensionally rigid plate and a rolling piston; the head plate is rigidly arranged on one of a vehicle body, an assembly frame, and a subframe; and vehicle-body-side joints of the upper transverse or diagonal link are supported on the head plate.

2. The independent suspension as claimed in claim 1, wherein the head plate comprises a support pot which is arched in the shape of a bell or hemisphere.

3. The independent suspension as claimed in claim 2, wherein the support pot has an encircling stiffening rib in a region of a greatest diameter of said support pot.

4. The independent suspension as claimed in claim 2, wherein an interior space of the support pot encloses a part of a gas spring volume.

5. The independent suspension as claimed in claim 2, wherein:
    said gas or hydropneumatic spring arrangement includes a shock absorber; and
    a vehicle-body-side joint of the shock absorber is supported on the support pot.

6. The independent suspension as claimed in claim 5, wherein the rolling piston is supported on a damper tube.

7. The independent suspension as claimed in claim 5, wherein the shock absorber is supported on a lower transverse or diagonal link.

8. The independent suspension as claimed in claim 1, wherein the bellows is a hose-type rolling bellows.

9. An independent suspension system for a vehicle, said system comprising:
    an upper wheel-control link having pivotable vehicle body side joints and a pivotable wheel carrier side joint;
    a lower wheel-control link;
    a wheel carrier pivotably coupled to said pivotable wheel carrier side joint of said upper wheel-control link via a wheel carrier arm, and to an outwardly disposed pivotable joint of said lower wheel-control link;
    a gas spring damper strut installed between said upper and lower wheel-control links; and
    front and rear transverse link carriers fixedly mounted to a frame element of said vehicle; wherein,
    said gas spring damper strut comprises a gas or hydropneumatic spring arrangement with a bellows arranged between a dimensionally rigid head plate and a rolling piston;
    said transverse link carriers support said head plate of said gas or hydropneumatic spring arrangement via first and second fastening brackets; and
    said vehicle body side joints of the upper wheel-control link are supported on said transverse link carriers, and are coupled to said head plate of said gas or hydropneumatic spring arrangement via said first and second fastening brackets.

* * * * *